(12) United States Patent
Huang et al.

(10) Patent No.: US 6,513,126 B1
(45) Date of Patent: Jan. 28, 2003

(54) SYSTEM FOR MODELING A PROCESSOR-ENCODER INTERFACE BY COUNTING NUMBER OF FAST CLOCK CYCLES OCCURING IN ONE SLOWER CLOCK CYCLE AND TRIGGERING A DOMAIN MODULE IF FAST CLOCK REACHES THE CORRESPONDING NUMBER OF CYCLES

(75) Inventors: Wen Huang, Sunnyvale, CA (US); Scarlett Wu, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/477,692

(22) Filed: Jan. 6, 2000

(51) Int. Cl.$^7$ .............. G06F 1/04; G06F 1/10; G06F 1/12
(52) U.S. Cl. ............ 713/500; 713/501; 713/502; 713/503; 713/600
(58) Field of Search ............... 713/500, 501, 713/502, 503, 600

(56) References Cited

U.S. PATENT DOCUMENTS

| | | | | |
|---|---|---|---|---|
| 4,258,300 A | * | 3/1981 | Fromont | 388/814 |
| 5,570,455 A | * | 10/1996 | Remillard | 704/250 |
| 5,758,133 A | * | 5/1998 | Evoy | 713/501 |
| 5,796,995 A | * | 8/1998 | Nasserbakht et al. | 713/503 |

* cited by examiner

*Primary Examiner*—Thomas Lee
*Assistant Examiner*—Paul Yanchus, III
(74) *Attorney, Agent, or Firm*—Suiter & Associates, PC

(57) ABSTRACT

An interface is provided between a digital signal processor or the like and an output encoder or the like that is capable of counting a system clock of the digital signal processor, generally having a higher clock rate, with respect to at least one or more clocks generally having a lower clock rate. The digital signal processor system clock is passed to the interface that has at least one or more counters. When the accumulation of the system clock reaches a corresponding number of the other clocks, a domain module in the output encoder is triggered, and the corresponding clock counters are reset. The interface may be implemented as a software modeling routine suitable for utilization by a digital signal processor simulator to facilitate complete whole cycle simulation in which multiple clocks having various clock rates may be simulated and compared with a behavior reference. The interface provides cycle-by-cycle comparison of the clocks in an asynchronous domain. The output encoder may be compliant with an International Elector-technical Commission standard such as an audio encoder standard.

20 Claims, 3 Drawing Sheets

SYSTEM FOR MODELING A PROCESSOR-ENCODER INTERFACE BY COUNTING NUMBER OF FAST CLOCK CYCLES OCCURING IN ONE SLOWER CLOCK CYCLE AND TRIGGERING A DOMAIN MODULE IF FAST CLOCK REACHES THE CORRESPONDING NUMBER OF CYCLES

BACKGROUND

When implementing a hardware design, it is often desirable to be able to model the behavior of the hardware design during the design process. Modeling of the behavior of the design allows the designer to quickly simulate and determine the performance of the design before completion and to make any necessary changes. Such a model is often utilized when a design includes interfacing two or more devices. For example, in an audio processing system, a digital signal processor (DSP) may be used to implement one or more audio processing algorithms. The output of the digital signal processor may then be passed through an interface to an encoding device that encodes the output into a format that is suitable for transmitting the DSP output to an intended receiving device. Often, the clock rate of the DSP and the clock rate of the encoding device are different such that it is desirable to determine and control the behavior of one device with respect the other. In some instances, it is desirable to account for multiple clocks. It would be advantageous for a designer to be able to model the interface behavior for at least one or more clock rates of at least one or more clocks. Furthermore, running a simulation on a general purpose simulator requires a simulation model that is too large and too slow to run a cycle-by-cycle simulation, especially in an asynchronous domain for asynchronous hardware. Thus, there lies a need for a system and apparatus by which the design of an interface may be modeled.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to at least one or more embodiments of the invention, an example of which is illustrated in the accompanying drawings.

Figure 1:
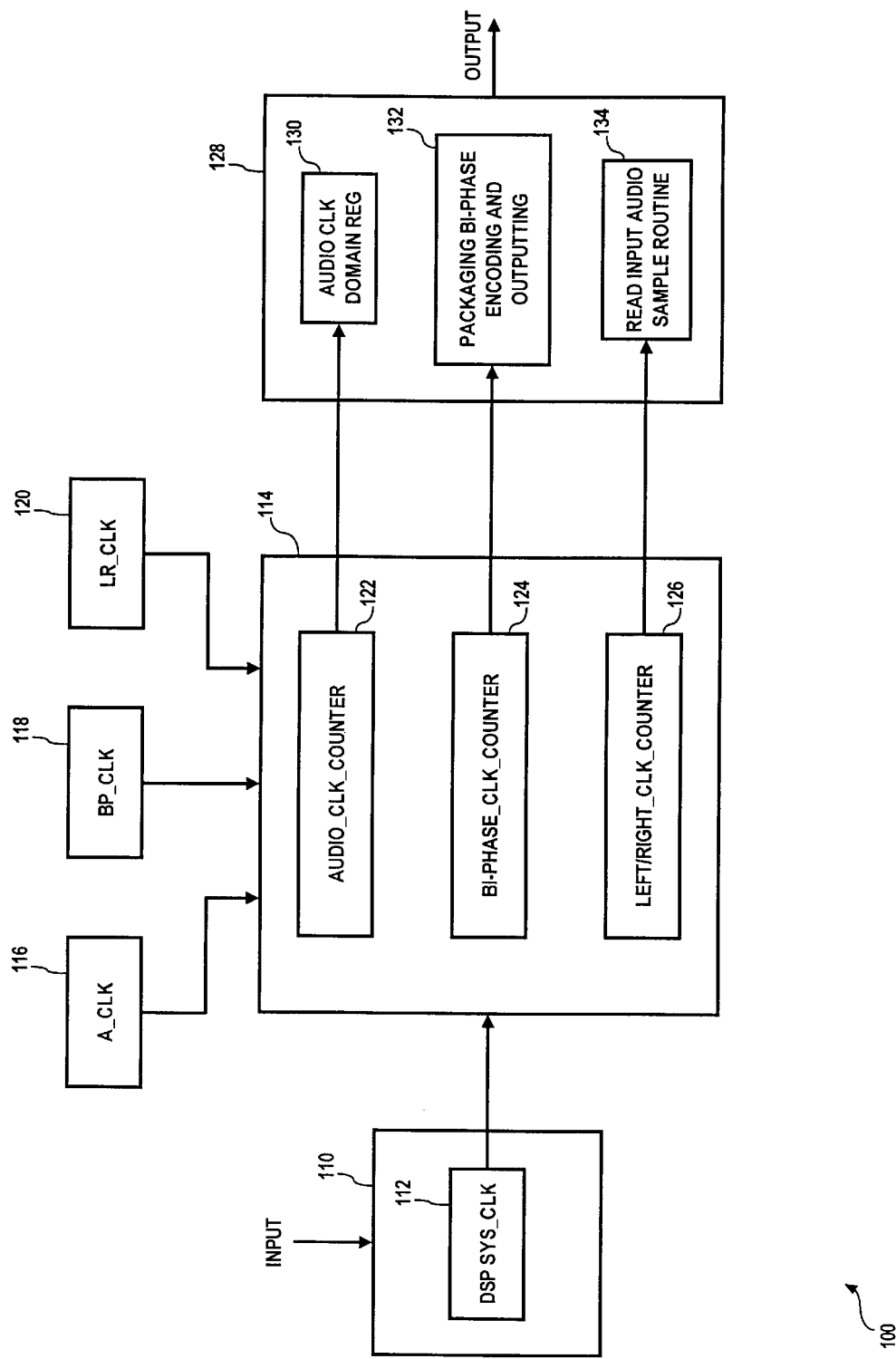
FIG. 1 is a block diagram of an system for interfacing two or more devices having differing clock rates.

Referring now to FIG. 1, a block diagram of an system for interfacing two or more devices having differing clock rates in accordance with the present invention will be discussed. System 100 includes a digital signal processor (DSP) 110 that is capable of processing a signal such as an audio signal. DSP 110 is capable of providing a system clock output (DSP SYS¯CLK) 112. DSP 110 may be, for example, a hardware embodied digital signal processor, a microprocessor capable processing digital signal being optimized to perform multiplications and additions in series (e.g., multiply and accumulate). DSP 110 may itself be modeled by a machine readable program of instructions capable of causing a machine such as a general purpose computer to implement instructions for causing the machine to simulate the behavior of a digital signal processor. For example, in one embodiment, DSP 110 may be modeled in a DSP C++ simulator (where C++ is known to those having skill in the art as a programming language being a version of the C programming language originally developed by Bell Laboratories). Other programming languages may also be utilized in lieu of C++ without providing a substantial change to the operation of system 100 and may include, for example, an assembly programming language, a FORTRAN programming language, a BASIC programming language, an ADA programming language, a JAVA programming language, or the like. System clock 112 of DSP 110 is provided to interface module 114 that is designed to provide an interface between DSP 110 and an encoding device, encoder 128. Interface module 114 may be implemented as a hardware device or by a machine readable program of instructions capable of causing a machine such as a general purpose computer to implement instructions for causing the machine to simulate the behavior of interface module 114. Likewise, in one embodiment of the present invention, encoder 128 is compliant with a standard of the International Electro-technical Commission (IEC). In one particular embodiment, encoder 128 is compliant with an IEC60958 encoder which itself may also be modeled by a machine readable program of instructions capable of causing a machine such as a general purpose computer to implement instructions for causing the machine to simulate encoder 128.

One or more clocks 116, 118, and 120, provide one or more respective clock signals to interface module 114. In one embodiment, clocks 116, 118, and 120 include an audio clock (A_CLK), a bi-phase clock (BP_CLK), and a left/right clock (LR_CLK), respectively. Interface module 114 receives at least one or more of clocks 116, 118, and 120, which are counted by at least one or more clock counters 122, 124, and 126. Clock counters 122, 124, and 126 include an audio clock counter (AUDIO_CLK_COUNTER), a bi-phase clock counter (BI_PHASE_CLK_COUNTER), and a left/right clock counter (L/R_CLK_COUNTER), respectively, for counting clock signals provided to interface module 114 by clocks 116, 118, and 120, respectively. Clock counters 122, 124, and 126 each provide an output to a respective one of encoder modules 130, 132, and 134 of encoder 128. In one embodiment, encoder modules 130, 132, and 134 am an audio clock domain module (AUDIO CLK DOMAIN REG), a module for packaging bi-phase encoding and outputting (PACKAGING BI-PHASE ENCODING AND OUTPUTTING), and a read input audio sample routine module (READ INPUT AUDIO SAMPLE ROUTINE), respectively. Encoder 128 is capable of encoding a signal provided by DSP 110 into a format suitable for transmission to an appropriate receiving device. In one embodiment, interface module is an asynchronous interface capable of being modeled in a C++ programming language or the like and which is capable of being modeled by a DSP C++ programming language simulator. In one embodiment, an audio clock configuration file may be provided, for example, for a user to program different audio clock rates of clock 116.

System clock 112 from DSP 110 (e.g., from a hardware version or from a DSP simulator) is passed to interface module 114. In one embodiment of the present invention, system clock 112 is an audio clock providing an audio clock domain for an input signal provided to DSP 110 in the case where the input signal is an audio signal. In accordance with the present invention, interface module 114 is a software module that models the behavior of an interface module between DSP 110 and encoder 128. The counters 122, 124, and 126 of interface module 114 count how many cycles of system clock 112 occur in one cycle each of clocks 116, 118, and 120, respectively. When the accumulation of cycles of system clock 112 reaches a corresponding number of clocks 116, 118 or 120, audio clock domain module 130 is triggered, and, at that time, the corresponding one of clock counters 122, 124, and 126 will be reset and again start counting. For example, if system clock 112 has two cycles per a single cycle of clock 116, then the audio clock domain module 130 may be triggered when the system clock 112 has accumulated six cycles and clock 116 has accumulated three cycles. In one embodiment of the present invention, interface module 114 is an asynchronous interface operating in an asynchronous domain. Further, interface module 114 may be, for example. modeled in C++ and fed into a DSP C++ simulator, and may include an audio clock configuration file to allowing a user to program different audio clock rates. In such an embodiment, interface module 114 provides a bridge between a clock domain of DSP 110 and an audio clock domain of encoder 128, complete with a whole cycle accurate C++ simulation. In operation, interface module 114 allows a designer to input an audio elementary bit stream and compare an output of encoder 128 with a behavioral reference. Interface module 114 facilitates debugging so that a designer is capable of monitoring sample and channel status values in an audio clock time domain. Additionally, interface module 114 is capable of providing a reference for real hardware at a cycle accurate level, especially in an asynchronous domain.

Figure 2:
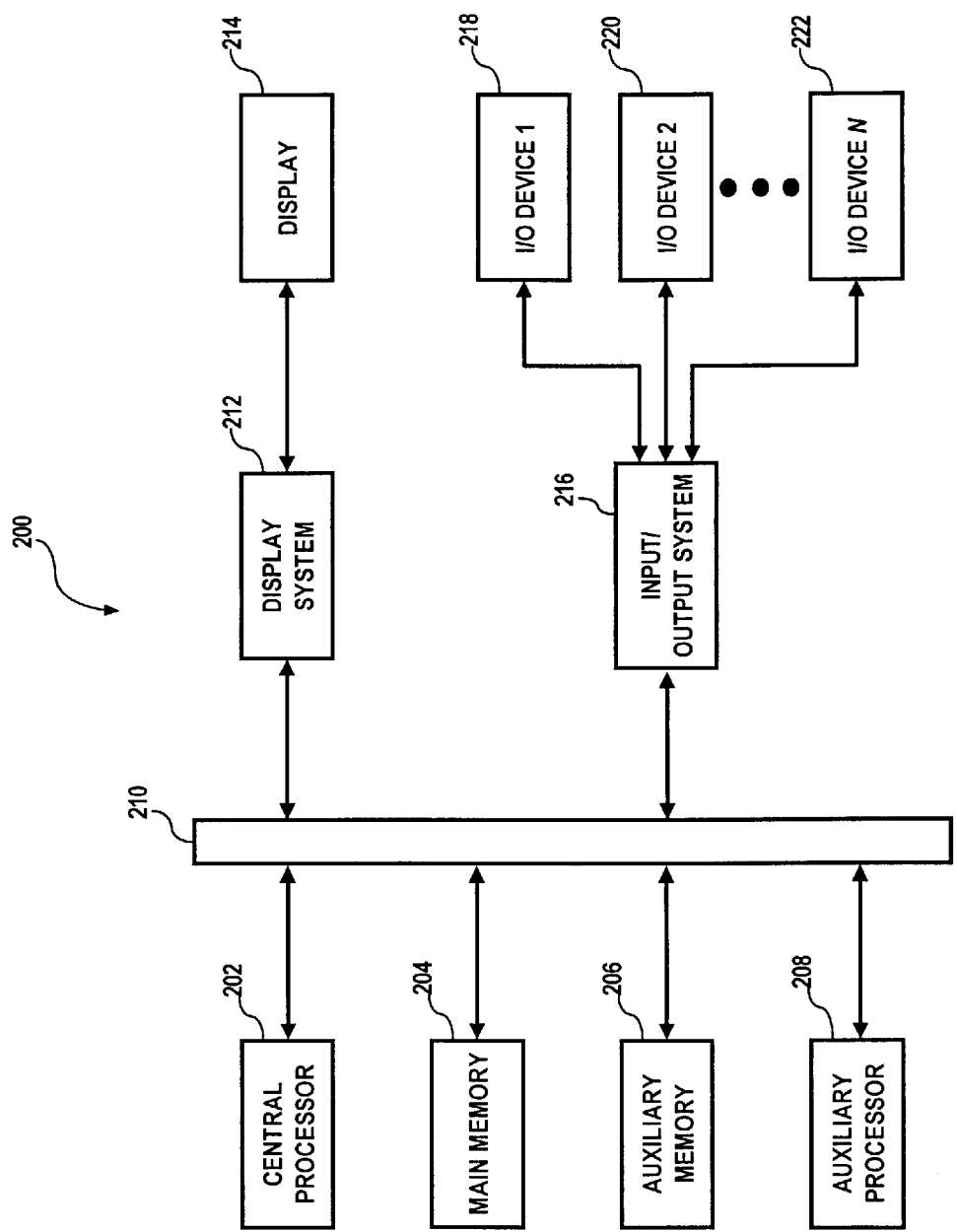
FIG. 2 is a block diagram of a computer system operable to embody at least one or more implementations of the present invention.
Figure 3:
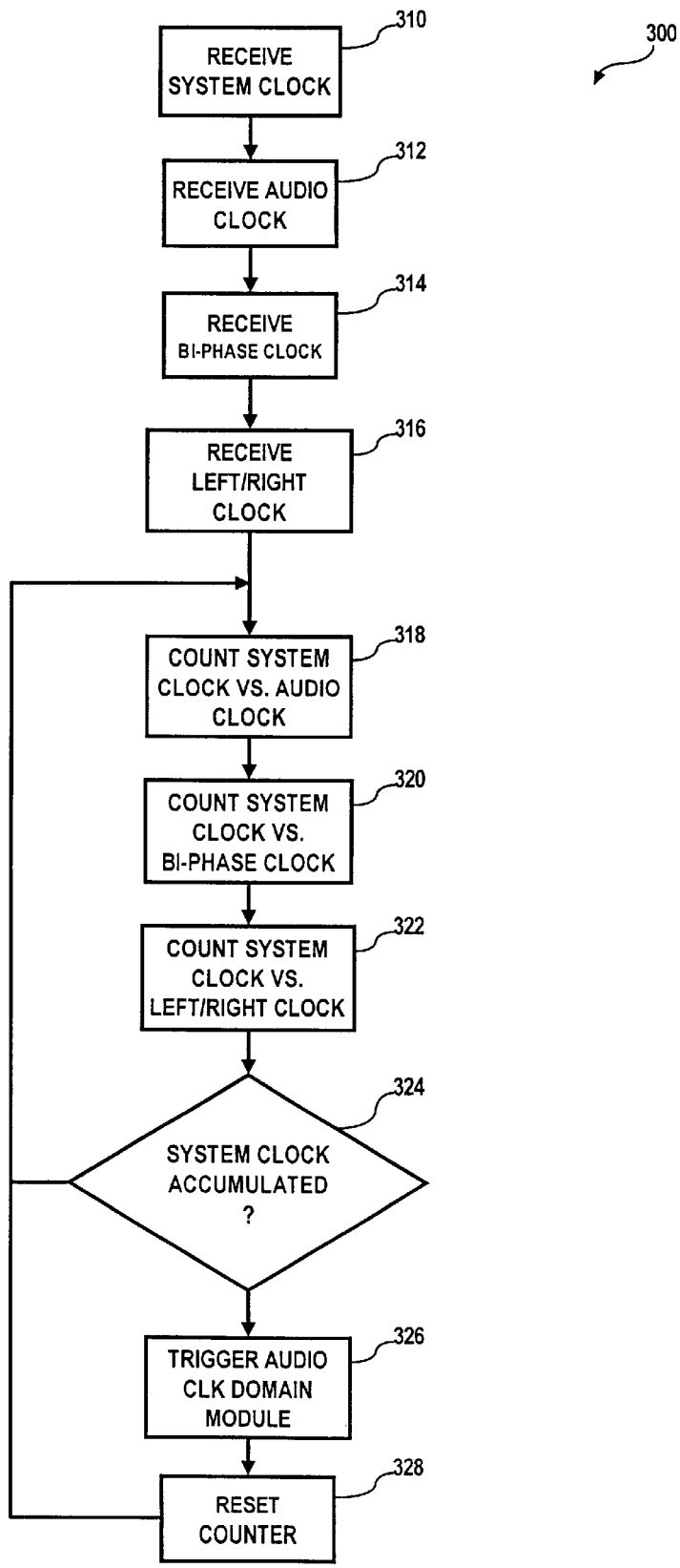
FIG. 3 is a flow diagram of a method for interfacing two or more devices having differing clock rates.

Referring now to FIG. 2, a hardware system in accordance with the present invention is shown. The hardware system shown in FIG. 2 is generally representative of the hardware architecture of a computer system embodiment of the present invention. Computer system 200 may be configured to implement system 100 of FIG. 1, for example, DSP 110, interface module 114, encoder 128, clocks 116–120, etc. Furthermore, computer system 200 may be specifically programmed by a machine readable program of instructions capable of causing computer system 200 to implement the steps carried output by system 100, for example, the steps of the method 300 as shown in FIG. 3. A central processor 202 controls the computer system 200. Central processor 202 includes a central processing unit such as a microprocessor or microcontroller for executing programs, performing data manipulations and controlling the tasks of computer system 200. Communication with central processor 202 is implemented through a system bus 210 for transferring information among the components of computer system 200. Bus 210 may include a data channel for facilitating information transfer between storage and other peripheral components of computer system 200. Bus 210 further provides the set of signals required for communication with central processor 202 including a data bus, address bus, and control bus. Bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 210 may be compliant with any promulgated industry standard. For example, bus 210 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of computer system 200 include main memory 204, auxiliary memory 206, and an auxiliary processor 208 as required. Main memory 204 provides storage of instructions and data for programs executing on central processor 202. Main memory 204 is typically semiconductor based memory such as dynamic random access memory (DRAM) and or static random access memory (SRAM). Auxiliary memory 206 provides storage of instructions and data that are loaded into the main memory 204 before execution. Auxiliary memory 206 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Computer system 200 may optionally include an auxiliary processor 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Computer system 200 further includes a display system 212 for connecting to a display device 214, and an input/output (I/O) system 216 for connecting to one or more I/O devices 218, 220, up to N number of I/O devices 222. Display system 212 may comprise a video display adapter having all of the components for driving the display device, including video random access memory (VRAM), buffer, and graphics engine as desired. Display device 214 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 216 may comprise one or more controllers or adapters for providing interface functions between one or more of I/O devices 218–222. For example, input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 216 and I/O devices 218–222 may provide or receive analog or digital signals for communication between computer system 200 of the present invention and external devices, networks, or information sources. Input/output system 216 and I/O devices 218–222 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of computer system 200 of FIG. 1 by one having ordinary skill in the art would not depart from the scope or the spirit of the present invention.

Referring now to FIG. 3, a flow diagram of a method for interfacing two or more devices having differing clock frequencies will be discussed. Method 300 may be executed by one or more elements of system 100 and may be embodied, for example, by computer system 200. Method 300 include a step 310 of receiving a system clock such as a system clock 112 from DSP 110, and a step 312 of receiving an audio clock such as a clock signal from audio clock 116. In one embodiment of the invention, the clock received at step 310 is a first clock having a higher clock frequency, and the clock received at step 312 is a second clock having a lower clock frequency than the first clock frequency. Additional clocks may be received at steps 314 and 316, respectively, and may be bi-phase clock 118 and left/right clock 120, respectively. At least one or more of clocks 116, 118, and 120 are counted at steps 318, 320, and 322, respectively, with respect to system clock 112 received at step 310. The number of cycles of system clock 112 may be counted in one cycle each of clocks 116, 118, and 120, respectively. A determination is made at step 324 whether accumulation of cycles of system clock 112 reaches a corresponding number of cycles of clocks 116, 118, and 120. Until a determination is made at step 324 that accumulation of cycles of system clock 112 reaches a corresponding number of cycles of clocks 116, 118, and 120, at least one or more of clock counting steps 318, 320, and 322 are continued. In the event it is determined at step 324 that accumulation of cycles of system clock 112 reaches a corresponding number of cycles of clocks 116, 118, and 120, audio clock domain module 130 of encoder 128 is triggered at step 326. At least one or more of clocks 116, 118, and 120 is reset at step 328 subsequent to an affirmative determination at step 324. Subsequent to execution of at least one or more of steps 326 and 328, at least one or more of counting steps 318, 320, and 322.

One having skill in the art, subsequent to having been disclosed the present invention, would recognize that method 300, when implemented by interface module 114, provides a bridge between a system clock domain of DSP 110 and an audio clock domain of encoder 128, complete with a whole cycle accurate software modeled simulation of system 100. Method 300 allows a designer to input an audio elementary bit stream to DSP 110 and compare a resulting output of encoder 128 with a behavioral reference using interface module 114. In addition, regression testing and debugging is facilitated using interface module 114, a C++ DSP simulator module such as for DSP 110, as well as an IEC60958 or the like compliant module such as for encoder 128 such that a designer is capable of monitoring sample and channel status values in the audio clock time domain. Also, interface module 1114 is capable of providing a reference for real hardware at a cycle accurate level.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 204 of one or more computer systems configured generally as described in FIG. 2. Until required by the computer system, the set of instructions may be stored in another computer readable memory such as auxiliary memory 206 of FIG. 2, for example in a hard disk drive or in a removable memory such as an optical disk for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for modeling and implementing a processor-encoder interface or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:
   providing a first clock having a higher clock frequency;
   providing a second clock having a lower clock frequency than said first clock;
   counting clock cycles of the first clock with respect to the second clock;
   determining whether the first clock has accumulated a corresponding number of clock cycles wherein said corresponding number is based upon a number of cycles of the first clock occurring in a single cycle of the second clock;
   in the event that the first clock has accumulated the corresponding number of clock cycles, triggering a domain module.

2. A method as claimed in claim 1, in the event that the first clock has accumulated the corresponding number of clock cycles, restarting said counting step.

3. A method as claimed in claim 1, the first clock being a system clock.

4. A method as claimed in claim 1, the second clock being an audio clock.

5. A method as claimed in claim 1, the second clock being a bi-phase clock.

6. A method as claimed in claim 1, the second clock being a left/right clock.

7. A method as claimed in claim 1, said counting and said determining steps being implemented asynchronously using a cycle-by-cycle comparison of the first and second clocks.

8. A machine readable program of instructions for causing a machine to execute a method for modeling an asynchronous interface, the method comprising:

providing a first clock having a higher clock frequency;

providing a second clock having a lower clock frequency than said first clock;

counting the first clock with respect to the second clock;

determining whether the first clock has accumulated a corresponding number of clock cycles wherein said corresponding number is based upon a number of cycles of the first clock occurring in a single cycle of the second clock;

in the event that the first clock has accumulated the corresponding number of clock cycles, triggering a domain module.

9. (Amended) A machine readable program of instructions as claimed in claim 8, in the event that the first clock has accumulated the corresponding number of clock cycles, restarting said counting steps.

10. A machine readable program of instructions as claimed in claim 8, the first clock being a system clock.

11. A machine readable program of instructions as claimed in claim 8, the second clock being an audio clock.

12. A machine readable program of instructions as claimed in claim 8, the second clock being a bi-phase clock.

13. A machine readable program of instructions as claimed in claim 8, the second clock being a left/right clock.

14. A machine readable program of instructions as claimed in claim 8, said counting and said determining steps being implemented asynchronously using a cycle-by-cycle comparison of the first and second clocks.

15. An apparatus, comprising:

means for providing a first clock output having a higher clock frequency;

means for providing a second clock output having a lower clock frequency than said first clock output;

means for counting the first clock output with respect to the second clock output;

means for determining whether the first clock output has accumulated a corresponding number of clock cycles wherein said corresponding number is based upon a number of cycles of the first clock output occurring in a single cycle of the second clock output; and means for triggering a domain module in the event that said determining means determines the first clock output has accumulated the corresponding number of clock cycles.

16. An apparatus as claimed in claim 15, further comprising means for restarting said counting means in the event sad determining means determines that the first clock output has accumulated the corresponding number of clock cycles.

17. An apparatus as claimed in claim 16, said restarting means comprising an interface module for interfacing a digital signal processor and an audio encoder.

18. A method as claimed in claim 15, said first clock output providing means being a digital signal processor.

19. A method as claimed in claim 15, said second clock output providing means being selected from a group comprising an audio clock, a bi-phase clock, and a left/right clock.

20. A method as claimed in claim 15, said counting means, said determining means, and said triggering means comprising an asynchronous, cycle-by-cycle interface module capable of interfacing a digital signal processor and an audio encoder.

* * * * *